United States Patent [19]

Major

[11] 4,143,525
[45] Mar. 13, 1979

[54] ACCUMULATING ROLL CONVEYOR

[76] Inventor: Harry Major, 612 Higbie Pl., Grosse Pointe Woods, Mich. 48236

[21] Appl. No.: 876,159

[22] Filed: Feb. 8, 1978

Related U.S. Application Data

[63] Continuation-in-part of Ser. No. 686,364, May 14, 1976, abandoned.

[51] Int. Cl.$^2$ .............................................. F16D 7/02
[52] U.S. Cl. .............................. 64/30 D; 64/27 NM; 64/30 R; 64/11 R
[58] Field of Search .............. 64/27 NM, 30 R, 30 D, 64/11 R

[56] References Cited

U.S. PATENT DOCUMENTS

| | | | |
|---|---|---|---|
| 1,144,067 | 2/1915 | Rundlof | 64/30 D |
| 3,605,990 | 9/1971 | Cowen | 198/781 |
| 3,932,956 | 1/1976 | Young | 64/30 D |
| 3,942,338 | 3/1976 | Furlette | 64/30 D |
| 4,056,953 | 11/1977 | Furlette | 64/30 D |

FOREIGN PATENT DOCUMENTS

| | | | |
|---|---|---|---|
| 922502 | 5/1949 | Fed. Rep. of Germany | 64/27 NM |
| 1506601 | 11/1967 | France | 198/781 |
| 35284 | 7/1957 | Luxembourg | 64/30 R |

Primary Examiner—Samuel Scott
Assistant Examiner—R. C. Turner
Attorney, Agent, or Firm—Burton, Parker & Schramm

[57] ABSTRACT

An accumulating roll conveyor comprising a plurality of rolls journaled between parallel longitudinally extending side frame members has roll shaft ends projecting beyond a common one of said side frame members with chain sprockets journaled on the projecting shaft ends for rotation relative thereto, a chain drive system is entrained over the sprockets for driving them, and a torque overload clutch means connects each sprocket to the shaft on which it is journaled with the torque transmitted from the sprocket to the shaft being provided by a radially compressible resilient element squeezable through a narrowed space between the sprocket and shaft upon predetermined resistance to rotation of the shaft and with such element being removable for replacement by an element of different resiliency to effect a change in the torque transmitted without disturbing the mounting of the roll between the side frame members.

5 Claims, 9 Drawing Figures

ACCUMULATING ROLL CONVEYOR

RELATED APPLICATION

This application is a continuation-in-part of application Ser. No. 686,364, filed May 14, 1976 now abandoned.

FIELD OF INVENTION

This invention relates to power driven accumulating type roll conveyors having provision for individual rolls to be automatically stopped during their rolling movement when the article being supported thereby is arrested during its travel along the conveyor.

BACKGROUND OF THE INVENTION

In U.S. Pat. No. 3,942,338 a roll for a roll conveyor is journaled for rotation relative thereto on a hexagonal supporting and driving shaft extending through the roll. Radially compressible tubular elements are disposed within the roll between the shaft and an encircling internal wall of the roll. A commercially produced roll conveyor constructed according to the disclosure of said patent has a series of such rolls mounted between longitudinally extending side frame members with sprockets or the like mounted on a projecting end of the drive shaft for each roll in rigid connection therewith to drive the shaft. Upon a predetermined resistance to rotation of the rolls, the radially compressible tubular elements are squeezed together and can rotate around each shaft within the roll thereby providing a torque-overload clutch between the shaft and the roll.

A serious problem with the commercial application of the concept disclosed in the aforesaid patent is that should it be necessary or desirable to replace even one of the radially compressible tubular elements the conveyor must be substantially completely disassembled. For example, should it be found that the torque-transmitted between one of the shafts and its companion roll was insufficient to drive the roll, an entire side frame member would have to be removed in order to permit replacement of the tubular element, or should it be found that a tubular element had become defective, similar disassembly of the entire conveyor would be required.

In a production environment where accumulating type roll conveyors are normally used, the time required to dismantle the conveyor of the type contemplated in the aforesaid patent imposes a serious limitation on the suitability of such conveyor for production applications. To disassemble even a short length of such a conveyor would require a number of hours of time during which the conveyor is obviously out of operation. Furthermore, as the torque transmitting force provided by the radially compressible tubular elements is essentially arrived at by a fit-and-try method, the tubular elements may be replaced and the conveyor assembled only to find that they still are not of the proper torque-transmitting capability requiring further disassembly of the conveyor in order to try out different tubular elements.

Therefore, I have discovered that in order to provide a commercially satisfactory conveyor of the accumulating roll type having a torque-overload clutching mechanism it is desirable to be able to remove the torque-transmitting elements without disturbing the conveyor rolls.

SUMMARY OF THE INVENTION

According to my disclosure as more particularly set forth hereinafter, the conveyor rolls are rigidly secured to supporting shafts which are journaled in the side frame members of the conveyor. One end of each shaft extends beyond a common one of said side frame members and on such projecting ends I have journaled chain sprockets for rotation on the shafts relative thereto. For example, I provide a torque-limiting clutch between a sprocket wheel and the shaft so that as the sprocket wheel is driven it in turn drives the shaft through the clutch. By mounting the clutch outboard of the conveyor side frame members it may be disassembled for repair or adjustment without disassembling the entire conveyor. Such clutch may comprise radially opposed surfaces of the shaft and the hub of the sprocket wheel between which is disposed one or more radially compressible tubular elements. One of the opposed surfaces, preferably that of the shaft, is radially displaced at one or more intervals therearound to provide narrowed spaces through which the tubular element is squeezed upon encountering a predetermined resistance to rotation by the roll. The sprocket is supported by bearing means at opposite sides of the compressible element with a portion of such bearing means being axially removable from the outer end of the shaft to expose the compressible element and permit ready withdrawal and replacement. Such may be accomplished expeditiously without disturbing the mounting of the roll. Thus, the torque transmitted from each sprocket wheel to the shaft may be readily varied as the circumstances of the conveyor installation require.

I have discovered, contrary to my expectation, that the interior of each sprocket housing the squeezable tubular elements must be sealed on the shaft, thereby preventing migration of oil, grease, water or other substances into the sprocket. Without such seal, the conveyor is subject to failure because introduction of substances into the sprocket which can act as lubricants causes the tubular element to simply slide or slip against the sprocket surface rather than roll. Accordingly, the tubular element is not squeezed through the aforesaid narrowed spaces and such a low order of torque is transmitted between the sprocket and shaft as to render the conveyor at the worst inoperative, and at best unreliable. In particular, any such lubricating media nullifies the capability of the design to provide a reasonably precisely variable torque overload value for the conveyor.

BRIEF DESCRIPTION OF PREFERRED EMBODIMENTS

Figure 1:
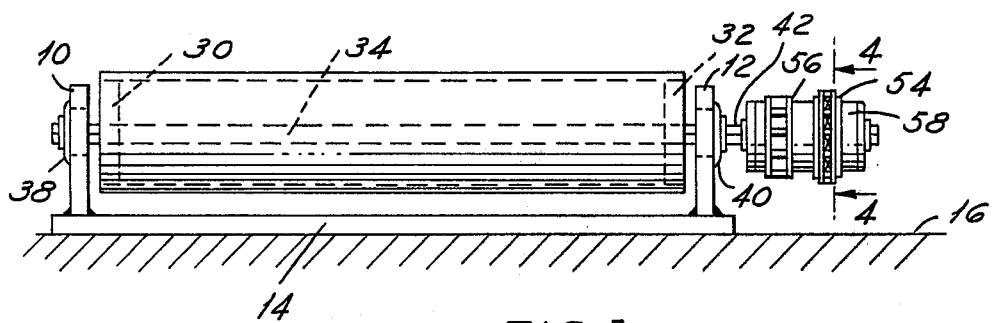
FIG. 1 is an end view of an accumulating roll conveyor embodying my invention.
Figure 2:
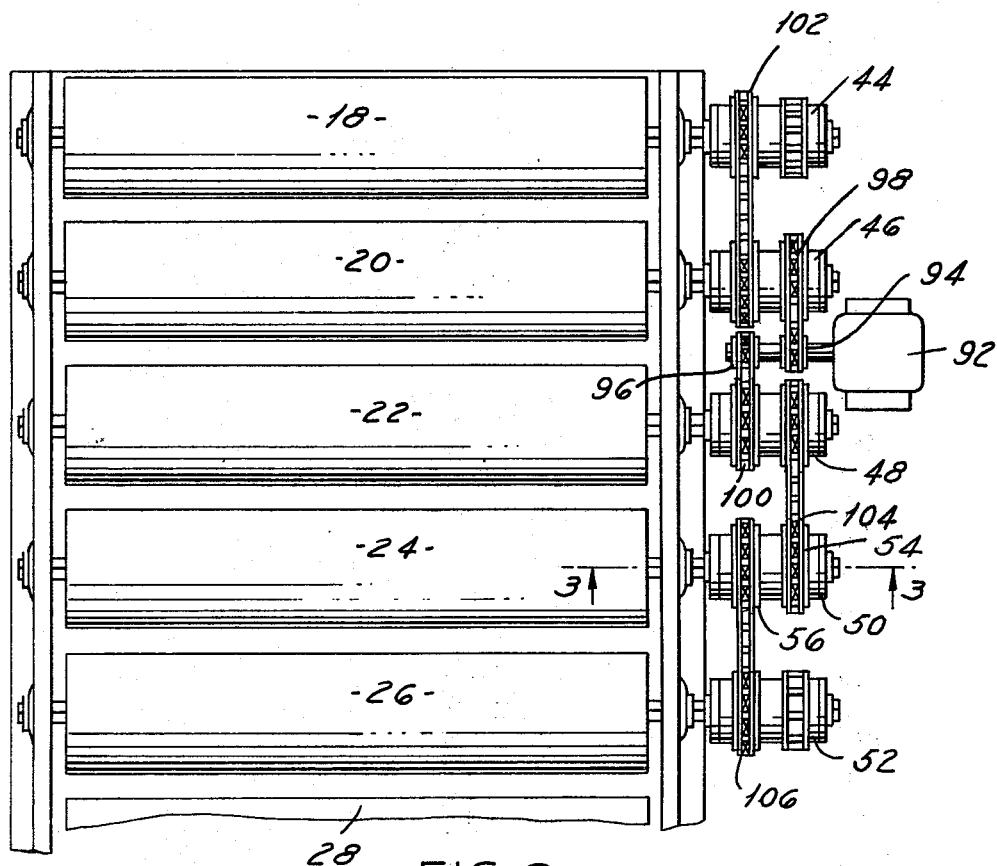
FIG. 2 is a plan view of a portion of an accumulating roll conveyor embodying my invention.
Figure 3:
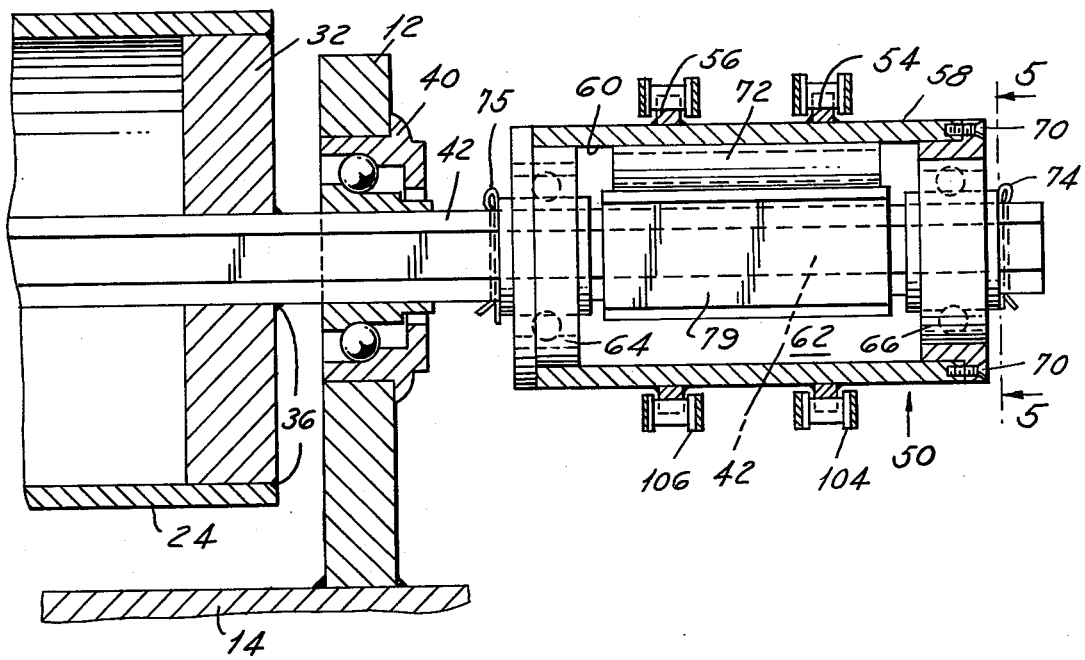
FIG. 3 is a cross-sectional view taken on the line 3—3 of FIG. 2.

As best shown in FIGS. 1, 2 and 3 a conveyor embodying my invention includes a frame having a pair of longitudinally extending laterally spaced apart side frame members 10 and 12 rigidly connected by cross frame members, one of which is shown at 14. The frame may be supported on the floor 16 of the plant or other environment within which it is to be used.

A plurality of conveyor rolls 18, 20, 22, 24, 26, and 28 are shown in FIGS. 1 and 2 in the form of tubular shaped rollers journaled between the parallel side frame members 10 and 12. Each roll has a coaxial drive shaft extending therethrough to which the roll is rigidly affixed. One such shaft is designated at 34 in FIG. 1. It is rigidly fixed to its roll by annular spacer members 30 and 32 which are secured to the shaft and to the roll such that upon rotation of the shaft the roll is driven. Each shaft is preferably of hexagonal cross-section and the spacers 30 and 32 are provided with central hexagonally shaped apertures through which the shafts are extended. The spacers, shaft and roll may be welded together at opposite ends as a unit as shown at one end in FIG. 3, or other suitable means may be provided for locking the rolls on the shafts.

The shafts are carried by journal bearings 38 and 40 mounted in the side frame members as shown in FIGS. 1 and 3. One end of the shafts extends beyond a common one of the side frame members, and as shown in FIGS. 1-3 the ends of the shafts project beyond the side frame member 12. Such projecting ends may be referred to as shaft end portions and in FIG. 3 are indicated at 42. On each shaft end portion is journaled a pair of sprocket wheels for receiving a pair of drive chains, the pairs of sprocket wheels being generally designated at 44-52 in FIG. 2. Each sprocket includes a pair of chain tooth receiving rings 54 and 56 spaced apart axially on and rigidly secured to or integral with a hub 58. The hub is provided with an internal cylindrical surface 60 spaced radially from the shaft end portion 42 to define therewith a generally annular space 62. A pair of axially spaced bearings 64 and 66 support the hub 58 on the shaft end for rotation relative thereto and close opposite ends of the annular space 62. The bearing 66 is removably axially received within the hub 58 and upon the shaft end 42 and is retained on the hub by a plurality of screw elements or the like 70. Cotter pins or the like 74 and 75 extending through the shaft retain the bearings thereon. Upon removal of the screws 70 and the cotter pin 74 the bearing 66 may be withdrawn from the hub and shaft to expose the axial outer end of the annular space 62.

Disposed within the annular space 62 between the hub and shaft end portion 42 are one or more radially compressible torque-transmitting, rollable tubular elements 72. These elements are axially removably received within the annular space and upon removal of bearing 66 a mechanic may reach into the annular space and withdraw the tubular element 72 and replace it as desired all without disturbing the roll 24. These tubular elements may be formed of any suitable resilient plastic material such as one of the urethanes, polypropylene, polyethelene, etc. It should be a material which will not become fatigued during the flexing to which it will be subjected nor embrittled or softened at the temperatures within which the conveyor will operate. While these elements are shown as being in the form of yellow cylinders, it should be understood that they may be sold cylinders provided the plastic material from which they are made is selected to have the requisite compressibility or distortability under operating conditions evident from the following description.

Figure 6:
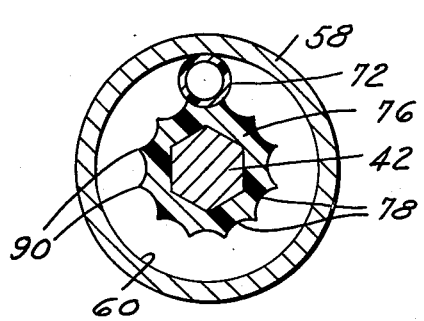
FIG. 6 is a view similar to FIG. 4 but showing a somewhat different configuration of the shaft.
Figure 7:
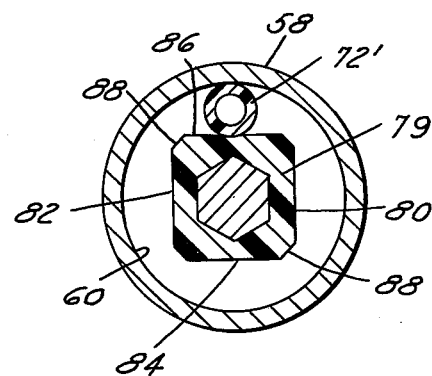
FIG. 7 is a view similar to FIG. 4 but showing a further configuration for the end of the shaft.
Figure 5:
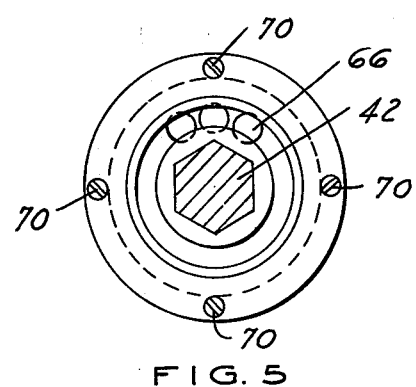
FIG. 5 is an end view of the sprocket assembly taken substantially on line 5—5 of FIG. 3.

Mounted on the shaft end portion within the hub to rotate with the shaft is a sleeve found of any suitable relatively rigid, tough material, plastic being shown, but metal may also be used. In FIGS. 6 and 7 I have shown two different sleeve configurations. In FIG. 6 I have shown a sleeve member 76 internally shaped to be slidably received in a slip fit on the shaft end portion 42 in non-rotatable relation therewith. The exterior of the sleeve 76 is provided with a plurality of circumferentially spaced axially extending shallow troughs or pockets 78 for nestably receiving the radially compressible roller 72. In FIG. 7 the sleeve is shown at 79 having an external surface in the form of a four-sided regular polygon in cross-section having parallel opposed flat faces 80, 82 84, and 86, the intersecting corners of which may be beveled if desired as at 88. These faces are disposed in opposition to the encircling cylindrical surface 60 of the hub portion 58. A radially compressible tubular roller 72' is shown disposed within the annular space between the sleeve and the hub portion.

Figure 4:
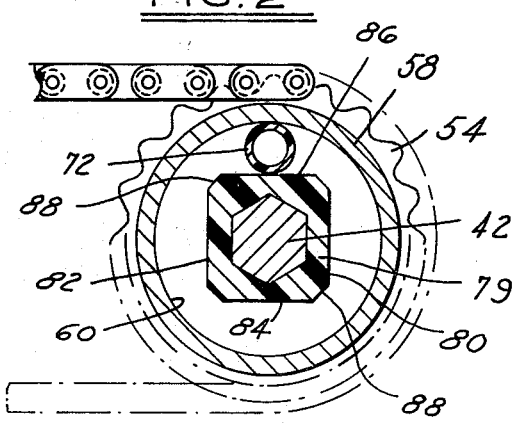
FIG. 4 is a cross-sectional view taken on the like 4—4 of FIG. 1.

It will be noted that in FIGS. 4 and 6 the tubular roller 72 has a relatively thin wall section while in FIG. 7 the tube wall is thicker. The heavier wall section will require more radial force in order to deform the tube sufficiently to permit it to roll around the shaft and allow relative rotation between the shaft and hub, or in other words, the heavier wall tube will provide a greater torque drive between the sprocket and shaft. The amount of torque-drive may also be varied by varying the external configuration of the sleeve. In general, the more the tube must be distorted in order to pass around the inside of the hub the greater the torque that will be transmitted.

It will be noted that the external surface of the sleeves 76 and 79 provide radially displaced surface portions projecting toward the internal cylindrical surface 60 of the hub which provide a succession of circumaxially spaced apart narrowed spaces. These narrowed spaces exist between the points or apices 90 of sleeve 76 and the encircling wall 60 of the hub as shown in FIG. 6 and between the beveled edges 88 and the encircling wall 60 of the hub in FIG. 7. It is through these narrowed spaces that the roller 72 or 72' must be squeezed in order for it to roll completely around the inside of the hub, and the squeezing force gives rise to the torque transmission between the hub and shaft.

The tubular elements 72 and 72' have an external diameter in the uncompressed state allowing them to be slip fitted between the bottom of the troughs 78 and the encircling surface 60 of the FIG. 6 embodiment or between the flats 80-86 and the encircling surface 60 in the FIG. 7 embodiment. However, the diameter of the tubular elements exceeds the radial distance across the narrowed spaces above mentioned such that the tubular element must be squeezed through such narrowed spaces.

The sprockets are preferably driven by a chain drive system including a motor 92 having a shaft carrying a pair of drive sprockets 94 and 96. Sprocket 94 drives the sprocket 46 through an endless chain loop 98 while sprocket 96 drives sprocket 48 through a chain loop 100. Sprocket 46 in turn drives sprocket 44 through an endless chain loop 102 while sprocket 48 drives sprocket 50 through an endless chain loop 104 and in turn sprocket 50 drives sprocket 52 through an endless chain loop 106. Thus, adjacent pairs of sprockets on adjacent shafts are driven by endless chain loops encircling adjacent pairs of the sprockets.

It will be appreciated that the sleeves 76 and 79 may be removed and replaced with sleeves of different external configurations to suit the particular torque requirements of the conveyor as the narrowness of the space between the points of the sleeve and the encircling wall 60 of the hub in combination with the wall thickness and durometer of the tubes 72 or 72' will permit substantial variations in torque transmitting capability.

Thus, I have shown, an accumulating roll conveyor where the effective driving torque applied to the conveyor roll may be varied at the chain sprocket exteriorally of the roll itself and where the amount of the torque may be varied without disturbing the roll and in a quick and expeditious manner by the mechanic thus substantially reducing the down-time of the conveyor should it be deemed necessary or desirable to remove and replace the radially compressible tubular elements 72 or 72', or the sleeves.

While I have shown sleeves 76 and 79 it will be understood by those skilled in the art that such sleeves are optional and the tubular elements 72 and 72' may be diametrically sized to operate between the flats of the shaft end portion 42 and the internal surface 60 of the hub without the interpositioning of the sleeve.

In operation, the motor 92 drives all the sprockets 44–52 in the same direction to similarly drive the rolls 18–28. An article to be conveyed resting on the rolls is thus conveyed. Should movement of the article be arrested, the rolls supporting the article will also tend to be arrested and by the provision of the torque-limiting clutch mechanism above described, the sprockets on the stalled shafts will continue to rotate and the radially compressible tubular elements 72 or 72' will roll around the inside of the sprocket hub being squeezed through the narrowed spaces between the shaft and hub.

Should it appear that one or more of the rolls supporting the article continues to rotate despite arrest of the article's forward movement, the mechanic can in a few minutes remove the outer bearing 66, extract the tubular element and replace it or the sleeve, or both, with substitute parts that provide a weaker torque drive. Conversely, should the conveyor fail to restart forward movement of an article once its arrest has been removed, or should the torque limiting clutch appear to be slipping and failing to cause article conveyance at the proper speed, similar changes may be made to increase the torque transmission from the sprocket to the shaft. All such adjustments in the torque transmission may be carried out without disturbing the conveyor rolls themselves, even while articles are supported thereon.

Figure 8:
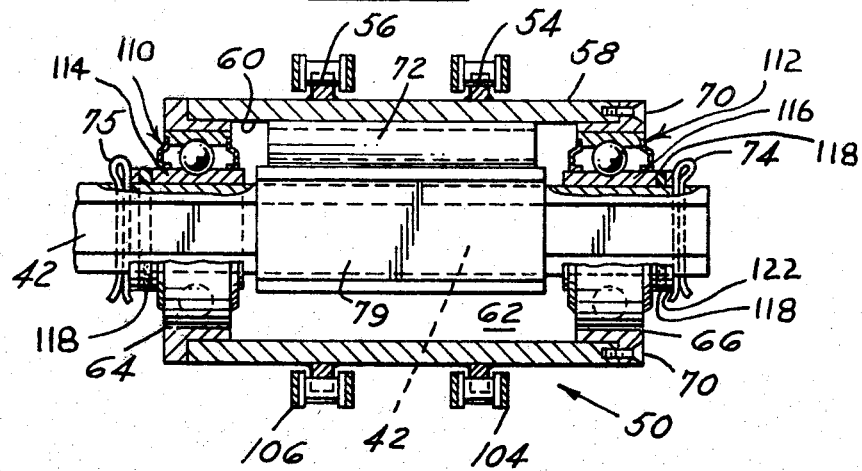
FIG. 8 is a view similar to the righthand portion of FIG. 3 but showing means for sealing the interior of the sprocket.
Figure 9:
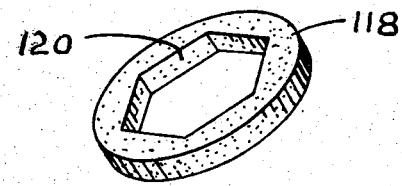
FIG. 9 is a perspective view of a sealing element for preventing migration of lubricating media along the shaft into the sprocket.

In FIGS. 8 and 9 I have shown a modification providing for the sealing of the interior of the sprockets 44–52. In FIG. 8 parts corresponding to those of FIG. 3 bear identical reference numerals. I have discovered that if a lubricating medium is allowed to enter the interior of the sprockets to contact the rollable tubular elements 72, the conveyor will not function properly. Analysis of the problem shows that the rollable tubular element 72 (see FIG. 6) simply slides around the interior surface 60 rather than rolling if a lubricating medium such as oil, grease or water is present. While conveyors constructed in accordance with the disclosure of FIGS. 1–7 will work satisfactorily until oil, grease, water and the like enters the sprockets, once this occurs serious malfunctions arise.

FIGS. 8 and 9 show structure overcoming the aforementioned problem. In FIG. 8, commercially available sealed ball bearing assemblies 110 and 112 are substituted for the bearings 64 and 66 shown in FIG. 3. Such bearings are commercially available from the Fafnir Bearing Co. under their trademark MECHANI-SEAL TYPE. Such bearings are "lubricated for life" and sealed to prevent the passage of oil, grease, water and the like through the bearing between the races.

However, such bearings do not prevent the leakage of lubricating media along the shaft 42 through the bore of the inner race. To prevent such leakage which at the same time allowing for ready disassembly of the sprockets to allow replacement of the tubular elements 72 or the sleeves 79, I provide an elastomeric washer or sealing member 118 as shown in FIGS. 8 and 9. Such member is desirably fabricated in the form of an annulus having an hexagonal hole 120 approximately 0.015"–0.020" undersize corresponding dimensions of shaft 42. The annulus may have an outside diameter corresponding with the outside end diameter of the inner race 114 and 116, and may have a thickness of 1/16". The annulus member 118 is bonded to the outside and face of the inner bearing races 114 and 116 utilizing any suitable adhesive. Bearings thus provided with the sealing annuli may be slipped on to the shaft 42 and the inside diameter surface 120 will stretch to effect a snug sealing engagement on the shaft preventing the migration of contaminating media along the shaft into the sprocket. Metal washers 122 overlie the sealing annuli to prevent abrasion thereof by the retaining pins 74 and 75.

What is claimed is:

1. In an accumulating type roller conveyor in which a supporting frame includes a pair of spaced apart parallel longitudinally extending side frame members, a plurality of parallel conveyor rollers extending transversely between and journaled on the side frame members, a drive shaft for each of the rollers rigidly secured thereto for driving the same and each shaft having an end portion projecting co-axially from one end of its associated roller and outwardly beyond a common one of said side frame members and being of hexagonal external configuration, and a chain sprocket wheel journaled on said end portion of each shaft for rotation relative thereto;

the invention characterized in that each chain sprocket wheel is provided with a hub having an internal surface spaced radially outwardly from the shaft end portion providing a generally annular space therebetween;

a sleeve freely axially slidably but non-rotatably mounted on the shaft end portion and having an external circumferential surface opposed to said internal surface of the hub but spaced radially therefrom to define an annular space therebetween, one of said surfaces having one or more radially displaced portions projecting toward the opposed surface to provide one or more narrowed spaces between the opposed surfaces;

at least one resiliently compressible torque transmitting rollable element disposed in said annular space and serving to drivingly couple each sprocket wheel to its associated drive shaft and roller, each said torque transmitting element normally acting to transmit the rotation of its sprocket wheel to the end portion of the drive shaft through said sleeve with which it is associated as long as the resistant load applied to the associated roller and shaft does not exceed a predetermined limit, but when such load does exceed this limit the torque transmitting element is rollably squeezed past said one or more narrowed spaces thus automatically discontinuing the driving relationship between the sprocket wheel and the shaft until the resistant load imposed on such shaft falls below said limit whereupon the drive shaft is again drivingly coupled to the sprocket wheel;

the invention being further characterized in that a pair of sealed anti-friction bearings is received within opposite ends of each sprocket hub for journaling the same on the shaft end portion and defining axially opposite ends of the annular space in which the one or more torque transmitting elements are contained, each such anti-friction bearing having an inner race slidably received on the shaft end portion, annular sealing means between the inner race of each anti-friction bearing and the associated shaft end portion to prevent migration of contaminating media along the shaft into said annular space; and means for removably locking the bearing nearer the outer end of the shaft within the hub but permitting removal of the bearing to gain access to the one or more torque transmitting elements and said sleeve in the hub for replacing such elements and/or sleeve by similar elements of different resilient compression or sleeve of different external diameter or configuration and accomplishing such operation without disturbing the conveyor rollers and any articles supported thereon.

2. The invention defined by claim 1 characterized in that the annular sealing means comprises an elastomeric washer bonded to the inner race of the anti-friction bearing and having an hexagonal aperture slightly smaller than the shaft end portion for slidable reception over the shaft end portion for sealing the bearing thereon.

3. The invention defined by claim 1 characterized in that said external circumferential surface of the sleeve is externally configured to provide peripherally spaced surface portions extending toward the opposed surface of the sprocket hub to provide a plurality of narrowed spaces between the sleeve and sprocket.

4. The invention defined by claim 3 characterized in that said sleeve is externally shaped to provide a plurality of circumaxially spaced apart shallow troughs for nestably receiving said torque transmitting rollable element and with the external surface of the sleeve intermediate the troughs cooperating with the opposed surface of the hub to define said narrowed spaces.

5. The invention defined by claim 5 characterized in that said sleeve is externally shaped to provide regular polygonal surfaces.

* * * * *

UNITED STATES PATENT OFFICE
CERTIFICATE OF CORRECTION

Patent No. 4,143,525  Dated March 13, 1979

Inventor(s) Harry Major

It is certified that error appears in the above-identified patent and that said Letters Patent are hereby corrected as shown below:

In the Claims:

In column 8, line 31, change "claim 5" to --- claim 3 --- .

Signed and Sealed this

Seventh Day of April 1981

[SEAL]

Attest:

RENE D. TEGTMEYER

Attesting Officer     Acting Commissioner of Patents and Trademarks